US008823241B2

(12) United States Patent
Jore et al.

(10) Patent No.: US 8,823,241 B2
(45) Date of Patent: Sep. 2, 2014

(54) SEGMENTED STATOR FOR AN AXIAL FIELD DEVICE

(75) Inventors: Matthew B. Jore, Ronan, MT (US);
James David Duford, Polson, MT (US);
Michael Kvam, Polson, MT (US);
Lincoln M. Jore, Ronan, MT (US);
David Samsel, Missoula, MT (US);
James D. Jore, Polson, MT (US)

(73) Assignee: Boulder Wind Power, Inc., Louisville, CO (US)

( * ) Notice: Subject to any disclaimer, the term of this patent is extended or adjusted under 35 U.S.C. 154(b) by 410 days.

(21) Appl. No.: 13/144,642

(22) PCT Filed: Jan. 15, 2010

(86) PCT No.: PCT/US2010/000112
§ 371 (c)(1),
(2), (4) Date: Jul. 14, 2011

(87) PCT Pub. No.: WO2010/083054
PCT Pub. Date: Jul. 22, 2010

(65) Prior Publication Data
US 2011/0273048 A1 Nov. 10, 2011
US 2014/0049130 A9 Feb. 20, 2014

Related U.S. Application Data

(60) Provisional application No. 61/205,435, filed on Jan. 16, 2009.

(51) Int. Cl.
| H02K 1/22 | (2006.01) |
| H02K 1/27 | (2006.01) |
| H02K 21/24 | (2006.01) |
| H02K 3/26 | (2006.01) |
| H02K 3/47 | (2006.01) |
| H02K 1/12 | (2006.01) |

(52) U.S. Cl.
CPC .................. *H02K 21/24* (2013.01); *H02K 3/26* (2013.01); *H02K 3/47* (2013.01); *H02K 1/12* (2013.01); *H02K 2211/03* (2013.01); *H02K 2203/03* (2013.01)
USPC ....... 310/268; 310/68 R; 310/71; 310/156.37; 310/179; 310/180

(58) Field of Classification Search
CPC ....... H02K 1/182; H02K 1/22; H02K 21/026; H02K 3/26; H02K 1/2793; H02K 21/24
USPC ............. 310/68 R, 71, 156.37, 268, 179, 180
IPC ............................ H02K 1/22, 1/27, 21/24, 3/26
See application file for complete search history.

(56) References Cited

U.S. PATENT DOCUMENTS 3,793,530 A   2/1974 Carter
3,796,039 A * 3/1974 Lucien ........................... 368/155

(Continued)

FOREIGN PATENT DOCUMENTS

| EP | 1732011 | 12/2006 |
| JP | 10-285894 A | 10/1998 |
| WO | WO 2010083054 A1 * | 7/2010 |

OTHER PUBLICATIONS

International Search Report and Written Opinion for International Application No. PCT/US2010/000112, mailed Mar. 16, 2010.

(Continued)

*Primary Examiner* — John K Kim

(57) ABSTRACT

An axial rotary energy device including a segmented stator assembly having a plurality of segments arranged in an annular array. Each stator segment is constructed by stacking a plurality of PCB power conductor layers and a plurality of PCB series layers. Each layer having radial conductors extending from an inner via to an outer via. The vias electrically connect selected radial conductors of the series conductor layer and power conductor layer. Each power conductor layer includes a pair of positive and negative terminal vias for one phase of the electric current connected to selected outer vias. A daughter PCB layer electrically connects two adjacent segments together by having a first portion electrically connected to a negative terminal via located in one segment and a second portion electrically connected to a positive terminal via located in an adjacent segment together with a current conductor electrically connecting the two terminal vias together.

7 Claims, 17 Drawing Sheets

(56) References Cited

U.S. PATENT DOCUMENTS

| | | |
|---|---|---|
| 4,035,659 A | 7/1977 | Jeppson |
| 4,168,439 A | 9/1979 | Palma |
| 4,242,628 A | 12/1980 | Mohan et al. |
| 4,261,441 A | 4/1981 | Wood |
| 4,281,965 A | 8/1981 | Stjernholm |
| 4,291,233 A | 9/1981 | Kirschbaum |
| 4,292,532 A | 9/1981 | Leroux |
| 4,318,019 A | 3/1982 | Teasley et al. |
| 4,336,475 A | 6/1982 | Morinaga et al. |
| 4,418,287 A | 11/1983 | Syverson |
| 4,658,162 A * | 4/1987 | Koyama et al. ............. 310/68 R |
| 4,720,640 A | 1/1988 | Anderson et al. |
| 4,804,574 A * | 2/1989 | Osawa et al. ................. 428/209 |
| 4,906,060 A | 3/1990 | Claude |
| 4,970,404 A | 11/1990 | Barger |
| 4,992,920 A | 2/1991 | Davis |
| 4,994,684 A | 2/1991 | Lauw et al. |
| 5,028,804 A | 7/1991 | Lauw |
| 5,083,077 A | 1/1992 | Wallace et al. |
| 5,099,162 A * | 3/1992 | Sawada ......................... 505/166 |
| 5,237,230 A | 8/1993 | Sugiyama et al. |
| 5,239,251 A | 8/1993 | Lauw |
| 5,260,617 A | 11/1993 | Leibowitz |
| 5,289,042 A | 2/1994 | Lis |
| 5,299,913 A | 4/1994 | Heidelberg |
| 5,315,159 A | 5/1994 | Gribnau |
| 5,370,711 A | 12/1994 | Audit et al. |
| 5,418,446 A | 5/1995 | Hallidy |
| 5,439,488 A | 8/1995 | Audit et al. |
| 5,506,453 A | 4/1996 | McCombs |
| 5,525,894 A | 6/1996 | Heller |
| 5,587,643 A | 12/1996 | Heller |
| 5,589,722 A * | 12/1996 | Sakaguchi et al. ............ 310/180 |
| 5,619,085 A | 4/1997 | Shramo |
| 5,783,894 A | 7/1998 | Wither |
| 5,798,631 A | 8/1998 | Spee et al. |
| 5,798,632 A | 8/1998 | Muljadi |
| 5,842,312 A | 12/1998 | Krumme et al. |
| 5,844,324 A | 12/1998 | Spriggle |
| 5,844,341 A | 12/1998 | Spooner et al. |
| 5,986,438 A | 11/1999 | Wallace et al. |
| 6,016,015 A | 1/2000 | Willard, Jr. |
| 6,040,650 A | 3/2000 | Rao |
| 6,064,123 A | 5/2000 | Gislason |
| 6,066,945 A | 5/2000 | Shimazu et al. |
| 6,072,303 A | 6/2000 | Nickoladze et al. |
| 6,097,104 A | 8/2000 | Russell et al. |
| 6,153,944 A | 11/2000 | Clark |
| 6,157,147 A | 12/2000 | Lin |
| 6,160,336 A | 12/2000 | Baker, Jr. et al. |
| 6,163,097 A | 12/2000 | Smith et al. |
| 6,163,137 A | 12/2000 | Wallace et al. |
| 6,172,429 B1 | 1/2001 | Russell |
| 6,177,735 B1 | 1/2001 | Chapman et al. |
| 6,215,199 B1 | 4/2001 | Lysenko et al. |
| 6,246,125 B1 | 6/2001 | Axtell |
| 6,249,058 B1 | 6/2001 | Rea |
| 6,278,197 B1 | 8/2001 | Appa |
| 6,285,090 B1 | 9/2001 | Brutsaert et al. |
| 6,327,994 B1 | 12/2001 | Labrador |
| 6,359,401 B1 * | 3/2002 | Garcia-Sinclair et al. . 318/400.4 |
| 6,373,161 B1 | 4/2002 | Khalaf |
| 6,392,371 B1 | 5/2002 | Cheng et al. |
| 6,412,237 B1 | 7/2002 | Sahai |
| 6,426,580 B1 | 7/2002 | Ikeda et al. |
| 6,429,552 B2 | 8/2002 | Asao et al. |
| 6,452,287 B1 | 9/2002 | Looker |
| 6,476,513 B1 | 11/2002 | Gueorguiev |
| 6,476,534 B1 | 11/2002 | Vanderbeck et al. |
| 6,476,535 B1 | 11/2002 | Oohashi et al. |
| 6,483,199 B2 | 11/2002 | Umemoto et al. |
| 6,504,260 B1 | 1/2003 | Debleser |
| 6,522,045 B2 | 2/2003 | Ikeda et al. |
| 6,522,046 B2 | 2/2003 | Ikeda et al. |
| 6,541,877 B2 | 4/2003 | Kim et al. |
| 6,598,573 B2 | 7/2003 | Kobayashi |
| 6,641,367 B1 | 11/2003 | Van der Klippe |
| 6,661,146 B2 | 12/2003 | Oohashi et al. |
| 6,664,704 B2 | 12/2003 | Calley |
| 6,665,990 B1 | 12/2003 | Cody |
| 6,693,409 B2 | 2/2004 | Lynch et al. |
| 6,741,000 B2 | 5/2004 | Newcomb |
| 6,781,276 B1 | 8/2004 | Stiesdal et al. |
| 6,794,777 B1 | 9/2004 | Fradella |
| 6,794,781 B2 | 9/2004 | Razzell et al. |
| 6,798,082 B1 | 9/2004 | Chen |
| 6,800,956 B2 | 10/2004 | Bartlett |
| 6,814,493 B2 | 11/2004 | Wobben |
| 6,826,874 B2 | 12/2004 | Takeuchi et al. |
| 6,833,633 B2 | 12/2004 | Wobben |
| 6,836,028 B2 | 12/2004 | Northrup et al. |
| 6,836,036 B2 | 12/2004 | Dube |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,853,094 B2 | 2/2005 | Feddersen et al. |
| 6,856,039 B2 | 2/2005 | Mikhail et al. |
| 6,876,176 B2 | 4/2005 | Stefanovi et al. |
| 6,891,302 B1 | 5/2005 | Gabrys |
| 6,897,577 B2 | 5/2005 | Weeber et al. |
| 6,903,466 B1 | 6/2005 | Mercier et al. |
| 6,909,211 B2 | 6/2005 | Ciciliani et al. |
| 6,911,741 B2 | 6/2005 | Pettersen et al. |
| 6,921,243 B2 | 7/2005 | Canini et al. |
| 6,929,671 B2 | 8/2005 | Kim et al. |
| 6,943,461 B2 | 9/2005 | Kaploun |
| 6,943,462 B2 | 9/2005 | Wobben |
| 6,943,478 B2 | 9/2005 | Zepp et al. |
| 6,946,750 B2 | 9/2005 | Wobben |
| 6,954,004 B2 | 10/2005 | Skeist et al. |
| 6,984,897 B2 | 1/2006 | Skeist |
| 7,004,724 B2 | 2/2006 | Pierce et al. |
| 7,011,598 B2 | 3/2006 | Flamang et al. |
| 7,019,413 B2 | 3/2006 | Kinoshita |
| 7,023,160 B2 | 4/2006 | Virtanen et al. |
| 7,042,109 B2 | 5/2006 | Gabrys |
| 7,042,110 B2 | 5/2006 | Mikhail et al. |
| 7,042,128 B2 | 5/2006 | Zepp et al. |
| 7,045,925 B2 | 5/2006 | Frager et al. |
| 7,049,719 B2 | 5/2006 | Wobben |
| 7,061,133 B1 | 6/2006 | Leijon et al. |
| 7,075,192 B2 | 7/2006 | Bywaters et al. |
| 7,081,696 B2 | 7/2006 | Ritchey |
| 7,084,520 B2 | 8/2006 | Zambrano et al. |
| 7,088,029 B2 | 8/2006 | Hiramatsu |
| 7,098,551 B2 | 8/2006 | Wobben |
| 7,105,941 B2 | 9/2006 | Hua |
| 7,105,975 B2 | 9/2006 | Semones et al. |
| 7,109,599 B2 | 9/2006 | Watkins |
| 7,109,625 B1 * | 9/2006 | Jore et al. ...................... 310/198 |
| 7,126,235 B2 | 10/2006 | Bernhoff et al. |
| 7,135,952 B2 | 11/2006 | Harding |
| 7,145,266 B2 | 12/2006 | Lynch et al. |
| 7,154,191 B2 | 12/2006 | Jansen et al. |
| 7,154,192 B2 | 12/2006 | Jansen et al. |
| 7,154,193 B2 | 12/2006 | Jansen et al. |
| 7,166,984 B1 | 1/2007 | Jones et al. |
| 7,170,212 B2 | 1/2007 | Balson et al. |
| 7,180,204 B2 | 2/2007 | Grant et al. |
| 7,186,083 B2 | 3/2007 | Bayly |
| 7,190,085 B2 | 3/2007 | Moehlenkamp |
| 7,190,101 B2 | 3/2007 | Hirzel |
| 7,205,678 B2 | 4/2007 | Casazza et al. |
| 7,215,038 B2 | 5/2007 | Bacon |
| 7,230,361 B2 | 6/2007 | Hirzel |
| 7,231,743 B2 | 6/2007 | Takeuchi et al. |
| 7,245,037 B2 | 7/2007 | Ängquist et al. |
| 7,253,543 B2 | 8/2007 | Akiyama |
| 7,289,329 B2 | 10/2007 | Chen et al. |
| 7,291,956 B2 * | 11/2007 | Itoh et al. ....................... 310/208 |
| 7,312,537 B1 | 12/2007 | Walling |
| 7,329,099 B2 | 2/2008 | Hartman |
| 7,332,837 B2 | 2/2008 | Ward et al. |
| 7,345,377 B2 | 3/2008 | Bacon |

(56) References Cited

U.S. PATENT DOCUMENTS

| | | |
|---|---|---|
| 7,348,705 B2 | 3/2008 | Cai et al. |
| 7,355,309 B2 | 4/2008 | Costin et al. |
| 7,358,624 B2 | 4/2008 | Bacon |
| 7,365,472 B2 | 4/2008 | Hiramatsu |
| 7,372,174 B2 | 5/2008 | Jones et al. |
| 7,375,449 B2 | 5/2008 | Butterfield |
| 7,385,330 B2 | 6/2008 | Trzynadlowski et al. |
| 7,414,331 B2 | 8/2008 | Datta |
| 7,425,771 B2 | 9/2008 | Rivas et al. |
| 7,437,264 B2 | 10/2008 | Pierce et al. |
| 7,439,714 B2 | 10/2008 | Gonzalez et al. |
| 7,446,435 B2 | 11/2008 | Zhang et al. |
| 7,468,569 B2 | 12/2008 | Hirzel |
| 7,478,777 B2 | 1/2009 | Wobben |
| 7,482,720 B2 | 1/2009 | Gordon et al. |
| 7,525,228 B2 * | 4/2009 | Chuang et al. ............... 310/112 |
| 7,538,446 B2 | 5/2009 | Bonnet |
| 7,545,052 B2 | 6/2009 | Gonzalez et al. |
| 7,573,173 B1 | 8/2009 | Frownfelter |
| 7,592,766 B2 | 9/2009 | Patel et al. |
| 7,595,574 B2 | 9/2009 | Ritchey |
| 7,612,463 B2 | 11/2009 | Cullen et al. |
| 7,633,770 B2 | 12/2009 | Datta et al. |
| 7,640,648 B1 | 1/2010 | Rittenhouse |
| 7,646,126 B2 | 1/2010 | Trzynadlowski et al. |
| 7,646,132 B2 | 1/2010 | Halstead |
| 7,646,178 B1 | 1/2010 | Fradella |
| 7,692,357 B2 | 4/2010 | Qu et al. |
| 7,710,081 B2 | 5/2010 | Saban et al. |
| 7,714,479 B2 | 5/2010 | Seneff et al. |
| 7,723,891 B2 | 5/2010 | Rittenhouse |
| 7,750,522 B2 | 7/2010 | Gizaw et al. |
| 7,781,932 B2 | 8/2010 | Jansen |
| 7,808,149 B2 | 10/2010 | Pabst et al. |
| 7,816,833 B2 | 10/2010 | Nair |
| 7,821,164 B2 | 10/2010 | Laskaris et al. |
| 7,830,057 B2 | 11/2010 | Gieras |
| 7,851,965 B2 | 12/2010 | Calley et al. |
| 7,852,643 B2 | 12/2010 | Zhang et al. |
| 7,888,839 B2 | 2/2011 | Gabrys et al. |
| 7,919,879 B2 | 4/2011 | Flannery et al. |
| 7,923,853 B2 | 4/2011 | Lewis |
| 7,923,886 B2 | 4/2011 | Calley et al. |
| 7,928,592 B2 | 4/2011 | Wagoner et al. |
| 7,939,959 B2 | 5/2011 | Wagoner et al. |
| 7,944,068 B2 | 5/2011 | Wagoner et al. |
| 8,097,970 B2 | 1/2012 | Hyvarinen |
| 8,115,348 B2 | 2/2012 | Hsu et al. |
| 8,138,620 B2 | 3/2012 | Wagoner et al. |
| 8,178,992 B1 | 5/2012 | Meller |
| 8,217,533 B2 | 7/2012 | Jones et al. |
| 8,222,792 B2 | 7/2012 | Platon et al. |
| 8,373,307 B2 | 2/2013 | Sihler et al. |
| 8,426,995 B2 | 4/2013 | Langel |
| 2004/0021437 A1 | 2/2004 | Maslov et al. |
| 2005/0120856 A1 * | 6/2005 | Duford et al. ............... 83/698.41 |
| 2006/0055265 A1 * | 3/2006 | Zalusky ................... 310/156.32 |
| 2006/0202584 A1 * | 9/2006 | Jore et al. ....................... 310/179 |
| 2007/0152536 A1 | 7/2007 | Chuang et al. |
| 2008/0088200 A1 | 4/2008 | Ritchey |
| 2008/0100166 A1 * | 5/2008 | Stahlhut et al. .......... 310/156.32 |
| 2008/0100174 A1 * | 5/2008 | Stahlhut et al. ................ 310/268 |
| 2009/0295231 A1 | 12/2009 | Gaffney et al. |
| 2011/0006600 A1 | 1/2011 | Fontana et al. |
| 2011/0133461 A1 | 6/2011 | Hjort |
| 2011/0241630 A1 | 10/2011 | Ritchey et al. |
| 2011/0273048 A1 * | 11/2011 | Jore et al. ................. 310/156.37 |
| 2012/0104894 A1 | 5/2012 | Van Den Bossche et al. |
| 2012/0155131 A1 | 6/2012 | Moreno-Castaneda et al. |
| 2012/0175962 A1 | 7/2012 | Zhan et al. |
| 2012/0200177 A1 | 8/2012 | Atkinson et al. |
| 2012/0217746 A1 | 8/2012 | Groendahl et al. |
| 2012/0217831 A1 | 8/2012 | Jore et al. |
| 2012/0221159 A1 | 8/2012 | Olesen |
| 2012/0243274 A1 | 9/2012 | Feng et al. |
| 2013/0015703 A1 | 1/2013 | Rouse et al. |

OTHER PUBLICATIONS

Office Action for Chinese Application No. 201080004779.4, mailed Feb. 6, 2013.

* cited by examiner

SEGMENTED STATOR FOR AN AXIAL FIELD DEVICE

CROSS-REFERENCE TO RELATED APPLICATIONS

This application is a National Stage Entry under 35 U.S.C. §371 of PCT/US2010/000112, filed Jan. 15, 2010, and entitled "Segmented Stator for an Axial Field Device," which claims priority to and the benefit of U.S. Provisional Patent Application No. 61/205,435, filed Jan. 16, 2009, and entitled "Segmented Stator for an Axial Field Machine."

FIELD OF THE INVENTION

The present invention relates to an improved stator for an axial field rotary energy device operating as a motor or a generator as described in U.S. Pat. No. 7,109,625 to Jore et al.

BACKGROUND OF THE INVENTION

The size of machines that may be produced with a one-piece printed circuit board (PCB) stator is limited by the capability of the processing equipment found in a PCB manufacturing facility. High volume facilities have a maximum size PCB panel that can be processed on automated equipment. Certain lower volume facilities routinely process larger PCB panel sizes than the high volume manufacturers but there is a higher cost due to more labor and higher material costs. In order to cost effectively produce large axial field rotary machines that incorporate a PCB stator, a segmented PCB stator is shown and described. The segments allow a much larger diameter machine than is possible with single piece PCB stator designs. Further, the segments may be produced in high volume manufacturing facilities that provide the best cost.

SUMMARY OF INVENTION

The present invention provides an axial rotary energy device which is arranged in a multi-phase electric current configuration. The device includes a rotor having a plurality of permanent magnet poles secured thereto and further includes a segmented stator assembly having a plurality of segments arranged in an annular array. Each stator segment is constructed by stacking a plurality of printed circuit board power conductor layers together with a plurality of much larger diameter machine than is possible with single piece PCB stator designs. Further, the segments may be produced in high volume manufacturing facilities that provide the best cost.

SUMMARY OF INVENTION

The present invention provides an axial rotary energy device which is arranged in a multi-phase electric current configuration. The device includes a rotor having a plurality of permanent magnet poles secured thereto and further includes a segmented stator assembly having a plurality of segments arranged in an annular array. Each stator segment is constructed by stacking a plurality of printed circuit board power conductor layers together with a plurality of printed circuit board series layers. Each stator segment having at least one working power conductor layer for each phase of the electric current and at least one series conductor layer associated with one power conductor layer. Each power conductor layer and series conductor layer having radial conductors extending from an inner diameter via to an outer diameter via. The vias are provided for electrically connecting selected ones of the radial conductors of the series conductor layer to selected ones of the radial conductors of the power conductor layer. Each power conductor layer includes a pair of positive and negative terminal vias for one phase of the electric current connected to selected outer vias of the power conductor layer. A daughter printed circuit board is used for electrically connecting two adjacent segments together. Each daughter printed circuit board having a first portion electrically connected to a negative terminal via located in one segment and a second portion electrically connected to a positive terminal via located in an adjacent segment. A current conductor is provided on the daughter printed circuit board for electrically connecting the negative terminal via and the positive terminal via together.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
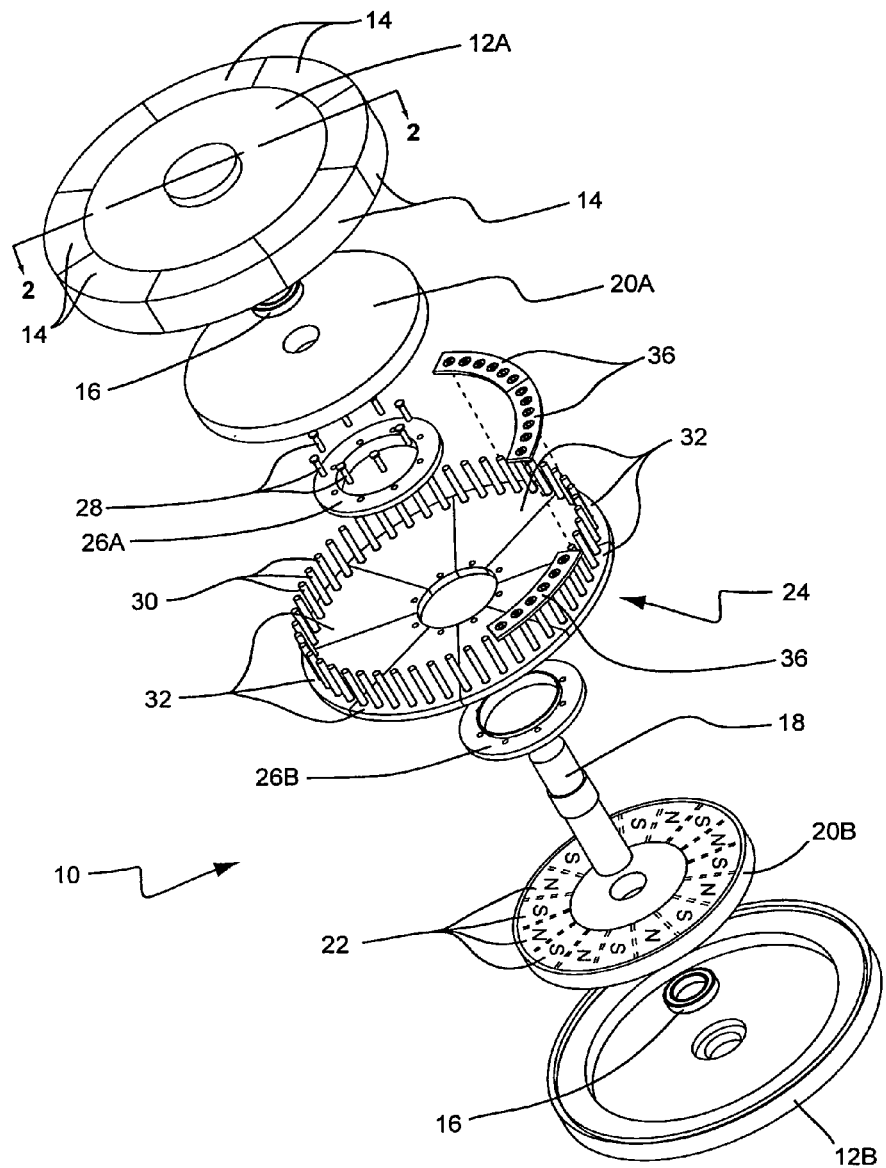
FIG. 1 is an exploded assembly view with parts broken away of an axial field device utilizing the present invention.

An axial gap device 10 according to the present invention is shown in FIG. 1 with a housing 12A having a number of terminal covers 14, a pair of bearings 16, a drive shaft 18, a pair of rotors 20A and 20B each having an annular array of permanent magnets 22 that alternate polarity around the array, another housing 12B, and a segmented stator assembly 24. The segmented stator assembly 24 is comprised of a pair of clamp rings 26A and 26B, a number of fasteners such as bolts 28, a plurality of terminal lugs 30, and a plurality of stator segments 32. The stator segments 32 are comprised of multiple layer printed circuit boards that are shaped to fit together to form an annular array of stator segments 32. The multiple layers of conductive material in each stator segment 32 provide a number of turns for each electrical phase of the axial gap device 10.

Figure 2:
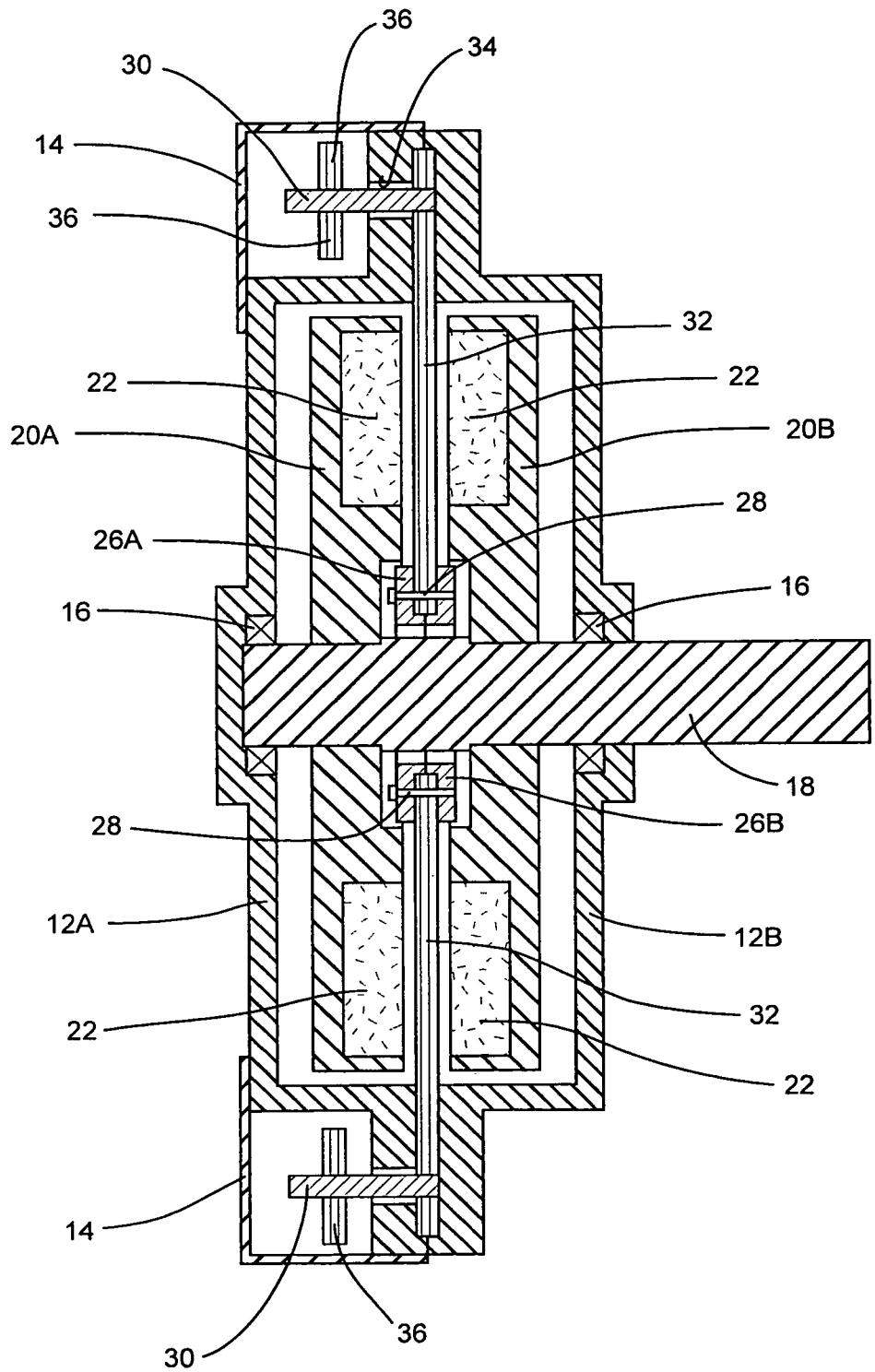
FIG. 2 is a cross-sectional view taken along the line 2-2 in FIG. 1 showing a first embodiment of the present invention.

FIG. 2 illustrates how the clamp rings 26A and 26B and bolts 28 fasten onto either side of the inward edge of the stator segments 32. The outer edge of the stator segments 32 are held in place by the clamping force of the housings 12A and 12B. The clamp rings 26A and 26B and the housings 12A and 12B suspend the stator assembly 24 in the air gap between the permanent magnets 22 mounted on the rotors 20A and 20B. As shown in FIG. 1, each stator segment 32 has a plurality of terminal lugs 30. The terminal lugs 30 are made of an electrically conductive material such as copper. The number of lugs on each segment depends upon the number of electrical phases in the machine. There is a positive and a negative terminal lug 30 for each phase. The illustrated device has three electrical phases and so each stator segment 32 has six terminal lugs 30. FIG. 2 shows how each terminal lug 30 passes through a lug opening 34 in the housing 12A to electrically connect the stator segment 32 to a daughter printed circuit board 36. An insulating material may be placed around the lug 30 where it passes through the lug opening 34 to prevent the lug 30 from making electrical contact with the housing 12A. The terminal lugs 30 are attached to the stator segments 32 and to the daughter printed circuit boards 36 by soldering or by fastening with some other means, such as a threaded nut over a threaded portion of a terminal lug 30. The multiple layer daughter printed circuit boards 36 electrically connect each phase in one stator segment 32 to each corresponding phase in an adjoining stator segment 32.

Figure 3:
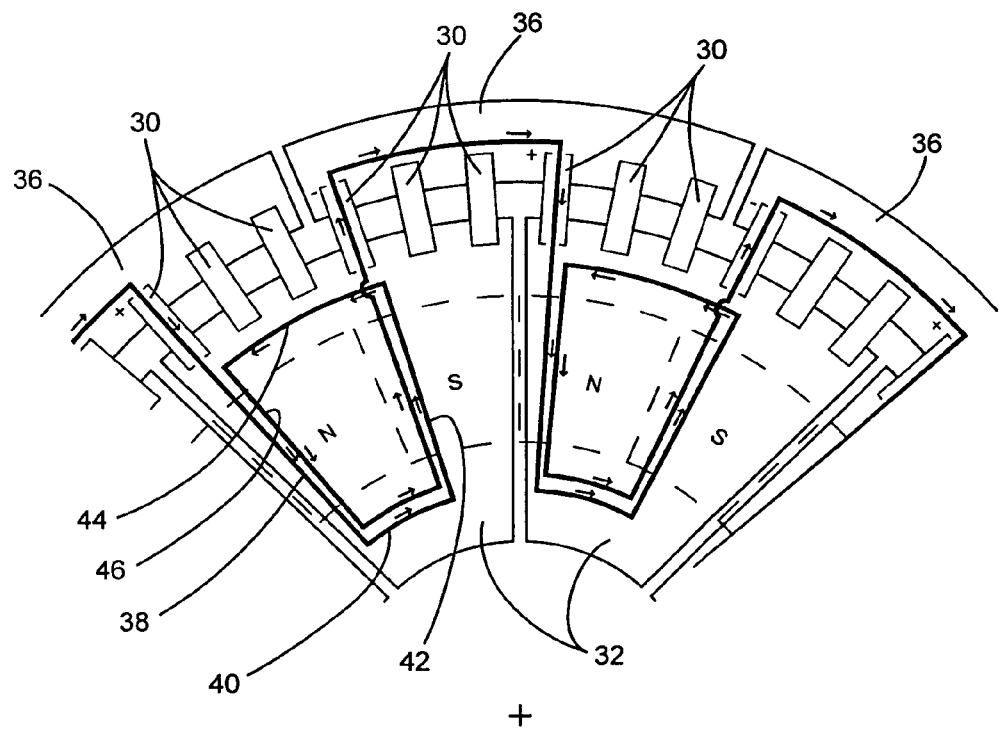
FIG. 3 is a schematic view showing the electrical circuit for one phase of the axial field device through selected stator segments and daughter printed circuit boards.

FIG. 3 diagrammatically shows the electrical circuit for one phase of the axial gap device 10 through selected stator segments 32 and daughter printed circuit boards 36. An electrical current enters a stator segment 32 through a positive terminal lug 30 for the particular phase. The current flows through a first working turn 38 (a working turn is the torque producing portion of the circuit within the magnetic gap of the axial field device 10), then into an inner turn 40, then into a second working turn 42, then into an outer end turn 44, and then into third working turn 46, and so on until the electrical current has passed through all of the turns for the particular phase in the stator segment 32. The first and third working turns 38 and 46 are associated with one magnetic pole and so the axial field device 10 shown is said to have two turns. The electrical circuit of the diagram in FIG. 3 is shown with two working turns however the number of working turns may be any number depending upon the performance requirement of the axial field device 10 and limited only by the physical space available for working turns in the stator segment 32. Also illustrated in FIG. 3 is the relationship between the number of stator segments 32 in the axial field device 10 to the number of magnet poles of magnets 22. In the preferred embodiment, there will be two magnet poles for every stator segment 32.

Continuing in FIG. 3, electrical current flows from the last working turn into the negative terminal lug 30 and the into the daughter printed circuit board 36 which conducts the electrical current from the negative terminal lug 30 of the first stator segment 32 to the positive terminal lug 30 of a second stator segment 32. The electrical current then flows through all of the turns for the particular phase in the second stator segment 32 and then out through the negative terminal lug 30 of the second stator segment to a second daughter printed circuit board 36. The electrical current is conducted through the entire segment array in the same manner.

Figure 4:
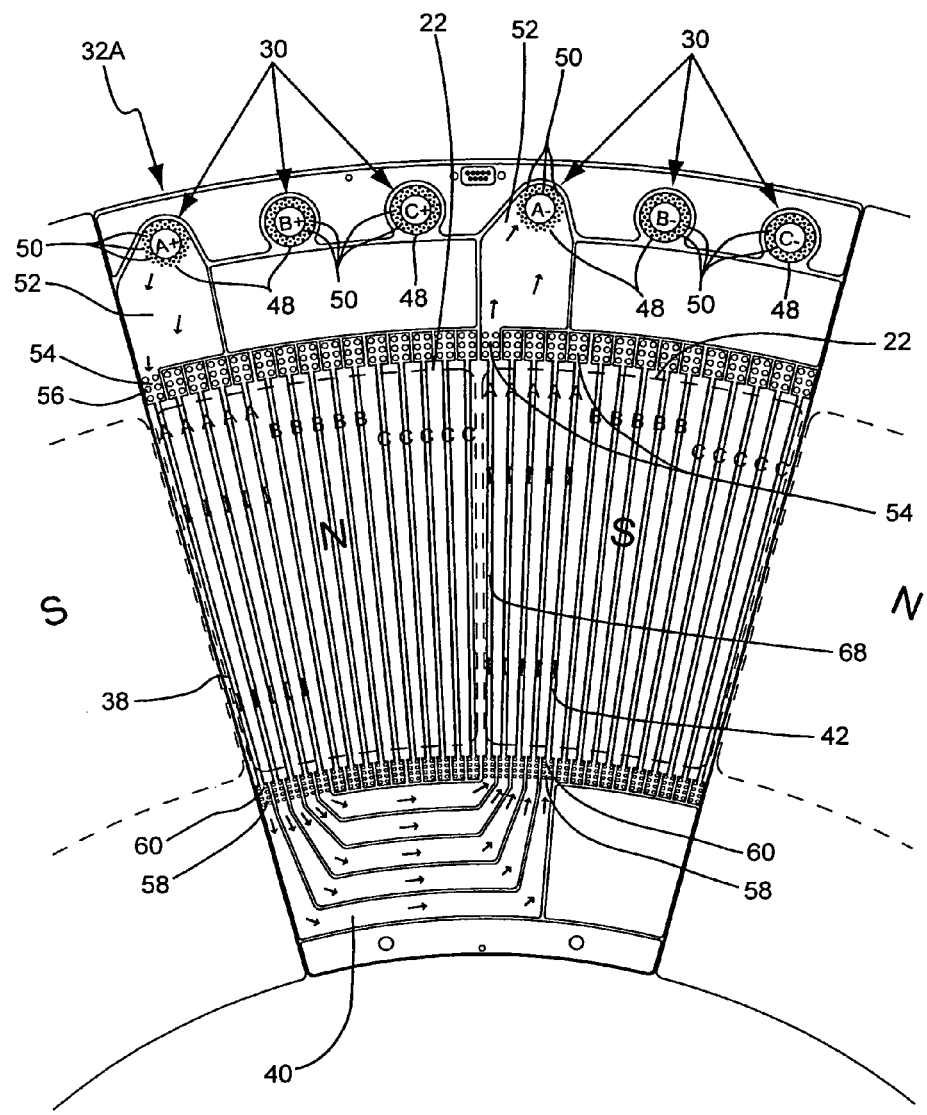
FIG. 4 is a detail view of one segment of a power layer of a stator board for phase A according to the first embodiment of the present invention.

FIG. 4 shows a pattern etched into one layer of conductive material in one of the stator power segments 32A. The pattern has a variety of conductive paths that relate to three electrical phases of the axial field device 10. The pattern has A+, B+, C+, A−, B−, and C− terminal lugs 30. Each of the terminal lugs 30 terminate in a terminal pad 48. Each of the terminal pads 48 have a plurality of terminal via 50 electrically connected to a respective terminal pad 48. A terminal conductor 52 electrically connects a terminal pad 48 to an outer via pad 54 having a plurality of outer vias 56. The pattern shown in FIG. 4 is called a power layer for electrical phase A since it is on this layer that the electrical connection is made to the stator segment 32 for phase A. The terminal conductors 52 of the power layer are continuous with terminal pads A+ and A−. Terminal pads 48 for B+, C+, B−, and C− are in contact with the corresponding terminal lugs 30 but the pads are not connected to terminal conductors 52 on this layer.

In FIG. 4, arrows show the direction of an electrical current to illustrate the relationships of the conductors of the power layer for phase A. The arrows are for reference only since the axial field device operates as a brushless DC or synchronous AC motor or generator. The current is shown to begin at the terminal pad 48 A+ and flow through the terminal conductor 52 to the outer via pad 54. The outer via pad 54 is continuous with a first working conductor 38 on the power layer for phase A. The first working conductor 38 connects the electrical current to the inner via pad 58. As shown in FIG. 4, the first working conductor 38 is substantially within the flux of the permanent magnets 22. Electrical current flowing through the first working conductor 38 will create the Lorenz force that acts between the flowing current and the magnetic flux. The outer via pad 54 has a number of outer vias 56 which are plated through holes that electrically connect the outer via pad 54 on the power layer for phase A to the corresponding outer via pads 54 on all of the other conductive layers of the stator segment 32. The inner via pad 58 also has a number of inner vias 60 that electrically connect the inner via pad 58 on the phase A power layer to the corresponding inner via pads 58 on all of the other conductive layers of the stator segment 32.

As seen in FIGS. 4 through 9, the outer via pad 54 is continuous with the first working conductor 38 on each of the conductive layers. Therefore, the outer vias 56 and the inner vias 60 connect all of the working conductors together so that the electrical current flowing through the first working conductor 38 on the power layer for phase A is in parallel with the corresponding working conductors 38 on all of the layers of the stator segment. This is the same for all of the working conductors for all of the phases of the stator segment.

Continuing in FIG. 4, the electrical current flows from the inner via pad 58 to the first inner end turn 40. From the first inner end turn 40, the electrical current flows to an inner via pad 58 which is connected to a second working conductor 42. The second working conductor 42 carries the electrical current to an outer via pad 54. The circuit appears to end at the outer via pad 54 but as previously described, the inner and outer vias 60 and 56 connect all of the second working conductors 42 on all of the layers of conductive material in parallel. The next pattern to be described shows how the circuit for phase A is continued.

Figure 5:
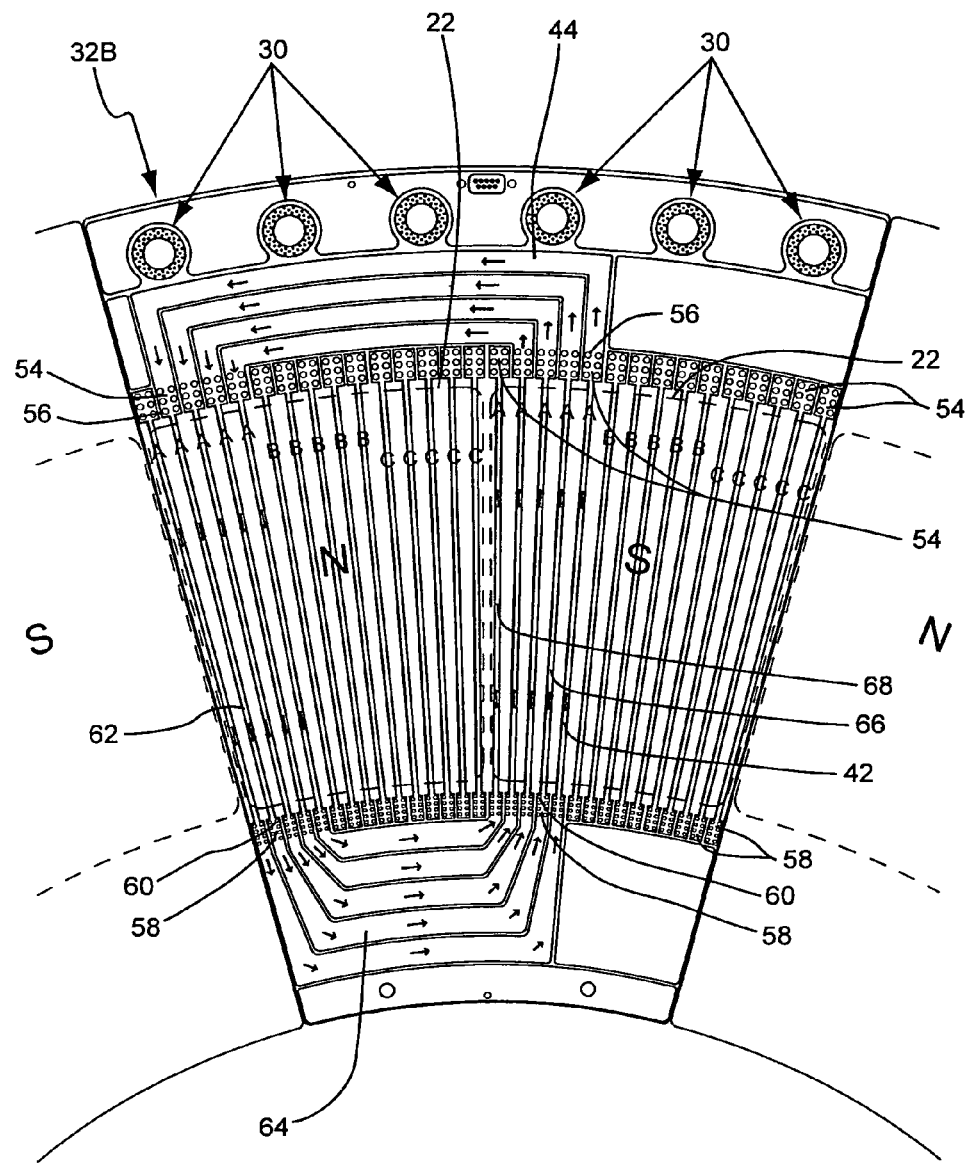
FIG. 5 is a detail view of one segment of a series layer of a stator board for phase A according to the first embodiment of the present invention.

FIG. 5 shows a pattern etched into another conductive layer of the stator series segment 32B. The pattern shown in FIG. 5 is called a series layer for electrical phase A since it contains the outer end turns that electrically connect the working turns for phase A in series. From the outer via pad 54 at the end of the second working conductor 42, the electrical current flows into the first outer end turn 44. The electrical current then flows to an outer via pad 54 with outer vias 56 and then to a third working conductor 62. From the third working conductor 62, the electrical current flows into an inner via pad 58 with inner vias 60. The third working conductors 62 on all layers of conductive material of the stator segment are electrically connected in parallel by the outer vias 56 and the inner vias 60. The electrical current continues from the inner via pad 58 to a second inner end turn 64 and then to an inner via pad 58 and then to a fourth working conductor 66. The electrical current continues on through the working conductors, outer via pads, outer end turns, inner via pads and inner end turns as shown in FIG. 5 until reaching a tenth working conductor 68. From the tenth working conductor 68, the electrical current flows to an outer via pad 54 with outer vias 56. The circuit appears to end at the outer via pad 54 but as previously described, the inner and outer vias 60 and 56 connect all of the tenth working conductors 68 on all of the layers of conductive material in parallel. Referring again to FIG. 4, the electrical current moves from the outer via pad 54 associated with the tenth working conductor to a terminal conductor 52 and then to an A− terminal pad 48.

Figure 6:
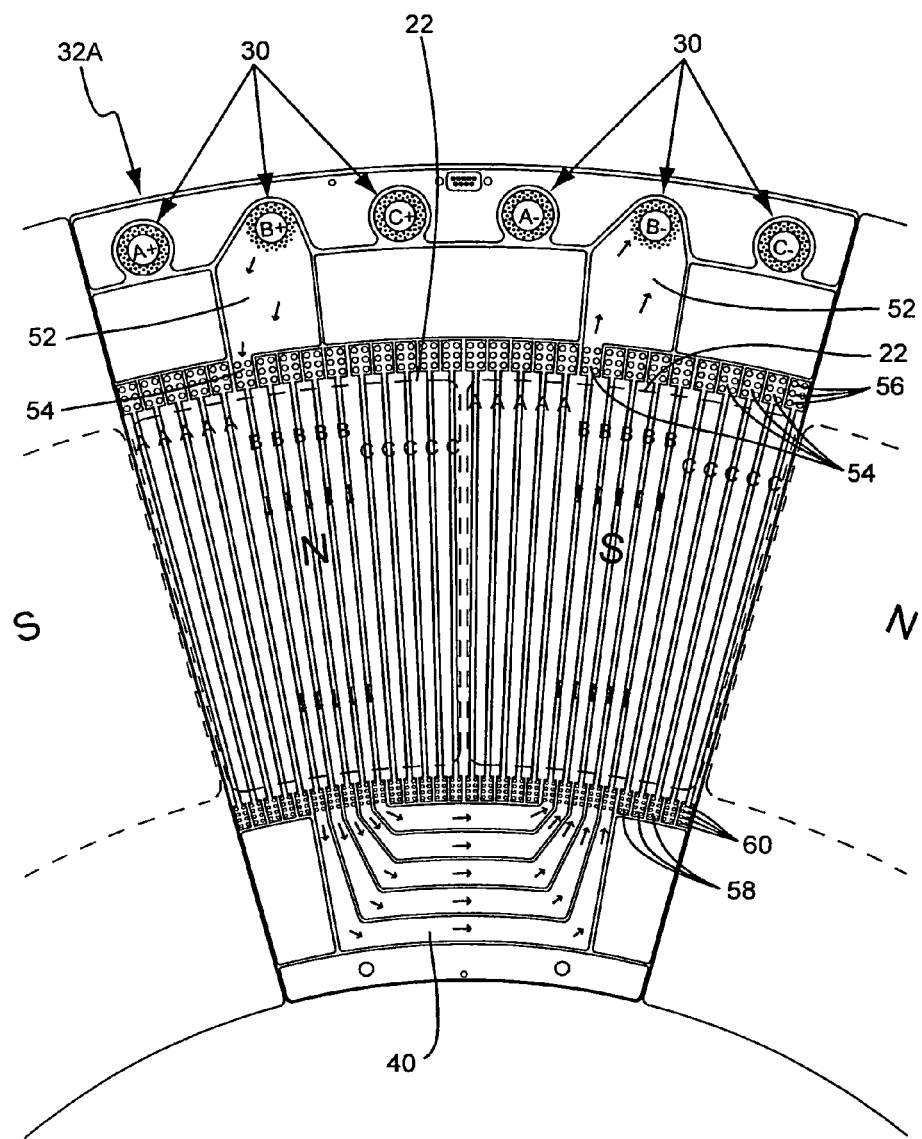
FIG. 6 is a detail view of one segment of a power layer of a stator board for phase B according to the first embodiment of the present invention.
Figure 7:
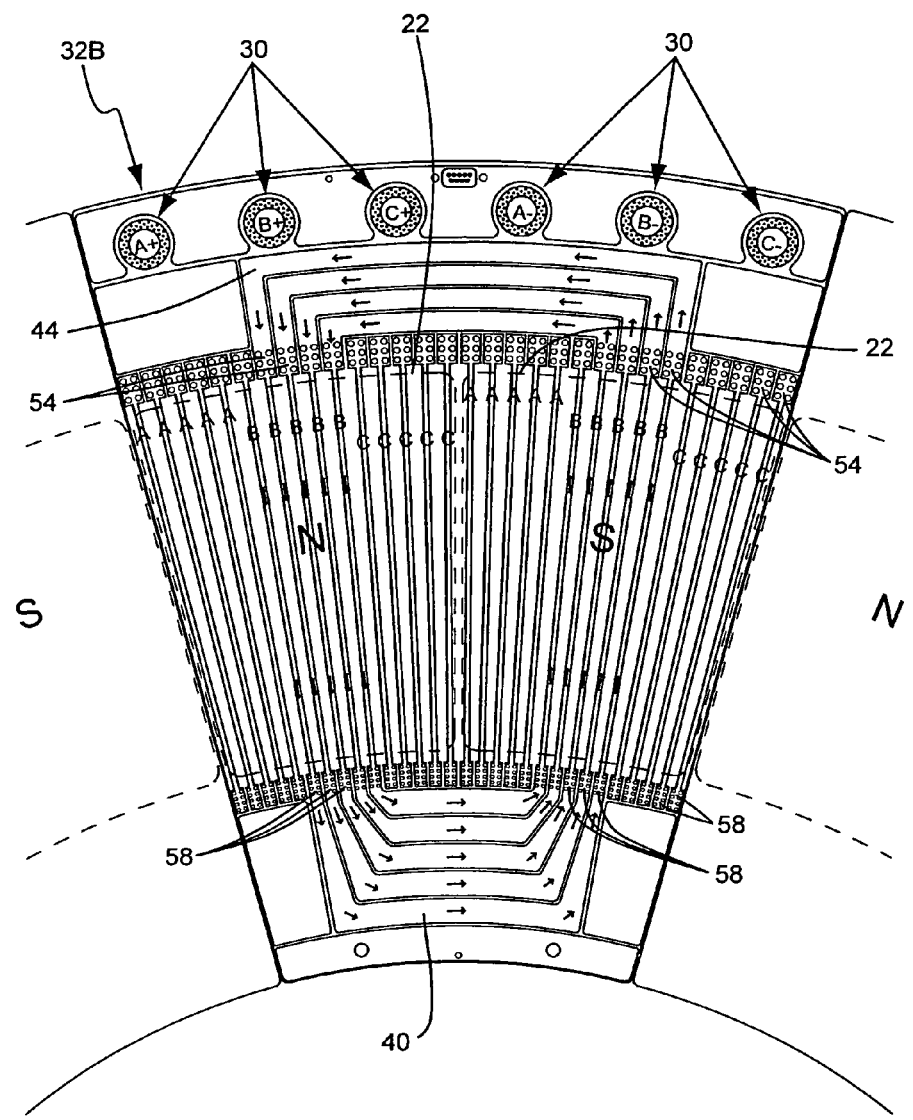
FIG. 7 is a detail view of one segment of a series layer of a stator board for phase B according to the first embodiment of the present invention.
Figure 8:
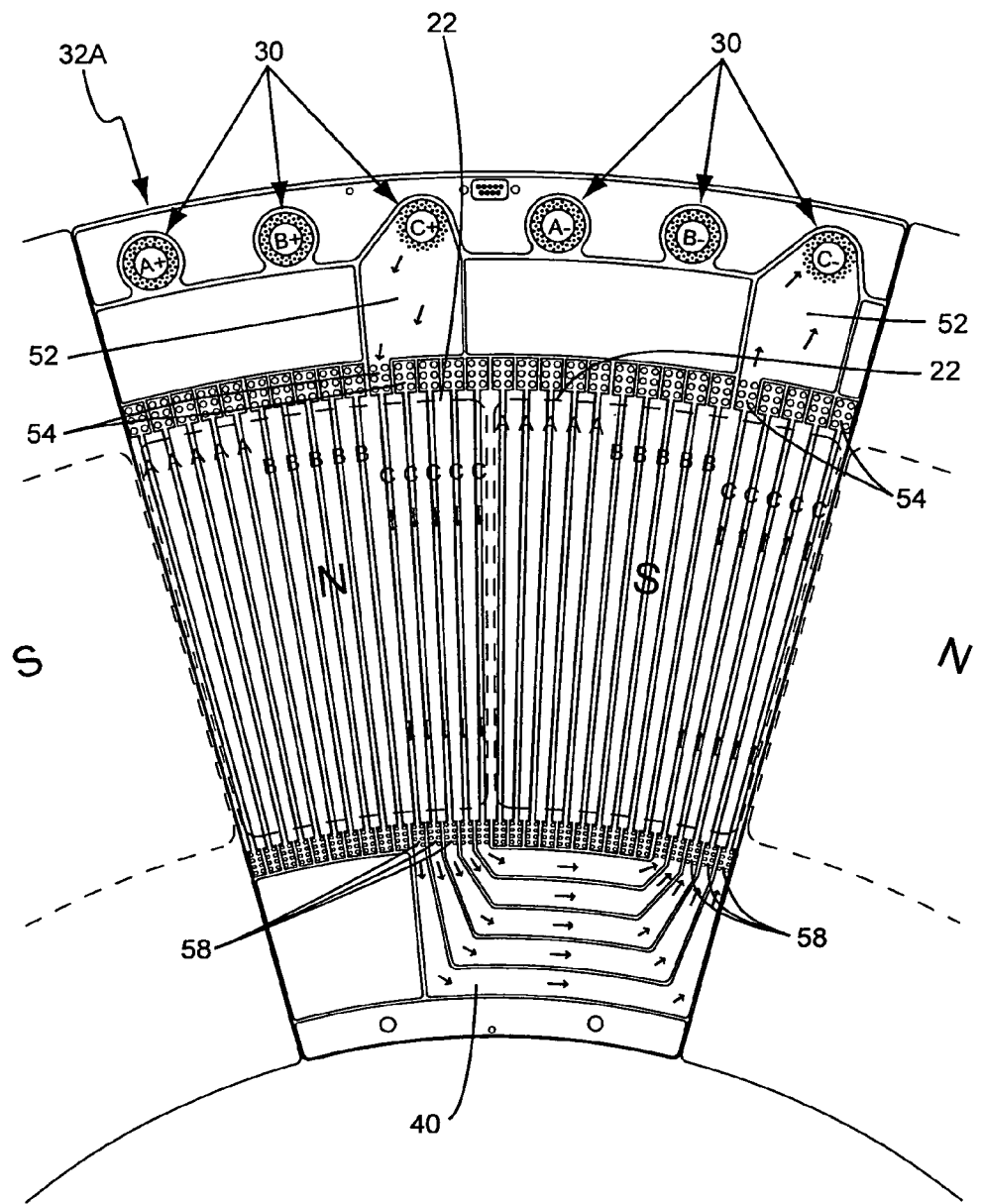
FIG. 8 is a detail view of one segment of a power layer of a stator board for phase C according to the first embodiment of the present invention.
Figure 9:
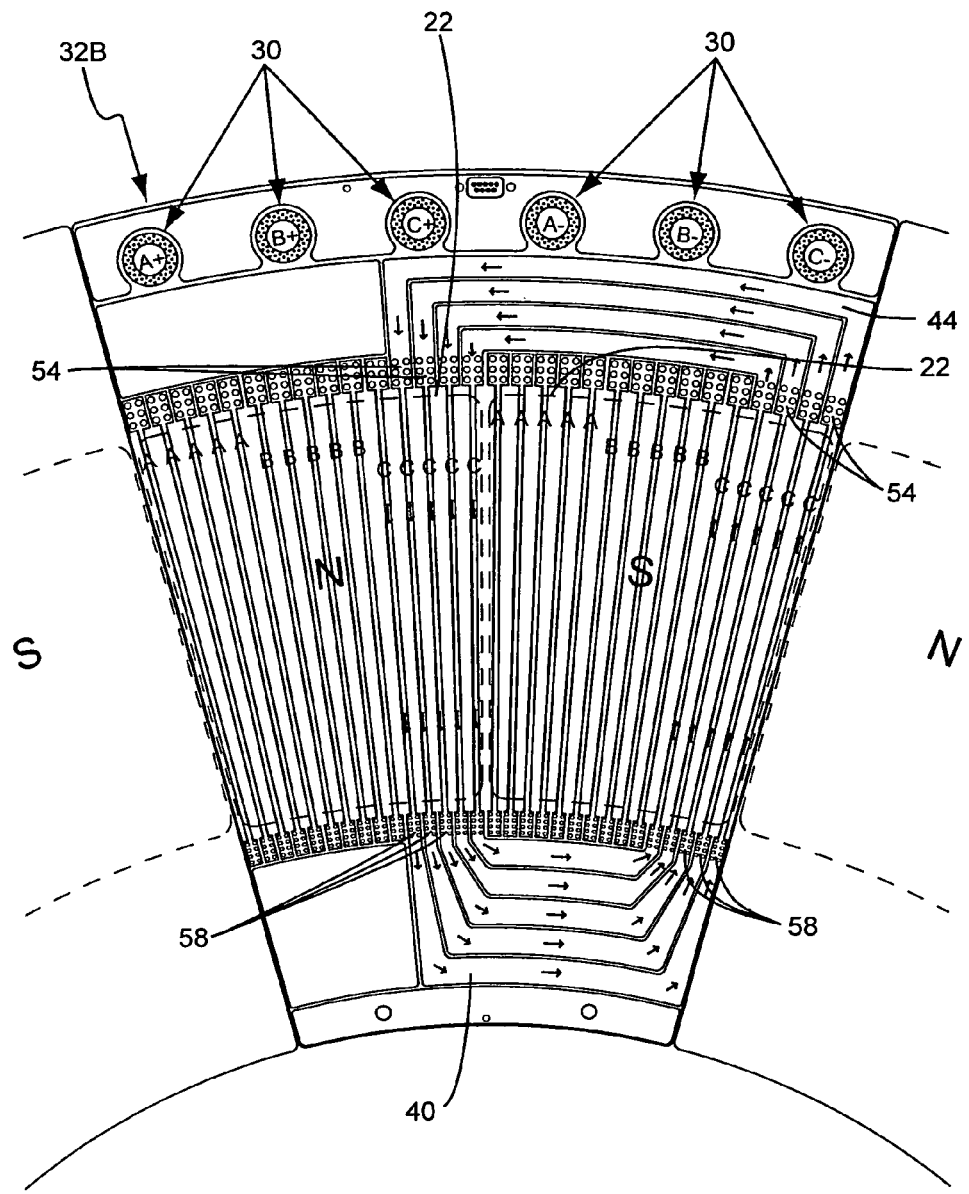
FIG. 9 is a detail view of one segment of a series layer of a stator board for phase C according to the first embodiment of the present invention.

The patterns and electrical current flow is similar for the power and series layers for phase B and phase C. FIG. 6 shows a pattern etched into another layer of conductive material of the stator power segment 32A that is a power layer for phase B. FIG. 7 shows a pattern on another layer that is a stator series segment 32B for phase B. FIG. 8 shows a pattern on a stator power segment 32A for phase C. And FIG. 9 shows a pattern on a stator series segment 32B.

The multiple layer stator segments 32 of the annular array comprising the entire stator are constructed by stacking the individual stator power segments 32A and stator series segments 32B for the A, B and C phases one on top the other with a substitute dielectric layer 33 provided between each layer. The stacking order of the stator power segments 32A and the stator series segments 32B for phases A, B and C is selectable. There may be duplicates of each layer type in the stator segment. There may be a greater number of series layers than power layers in the stator segment. The order of the layers is preferably selected to provide an even distribution of electrical current throughout different layers of the stator segment and particularly so that there is an even distribution of electrical current through the axial length of the inner and outer vias. The main benefit of the even distribution of the electrical current is to optimize the thermal dissipation of the stator segment 32. The durability of each stator segment 32 is enhanced by reducing the thermal stress that can cause delamination of the layers and cracking in the walls of the vias.

Figure 10:
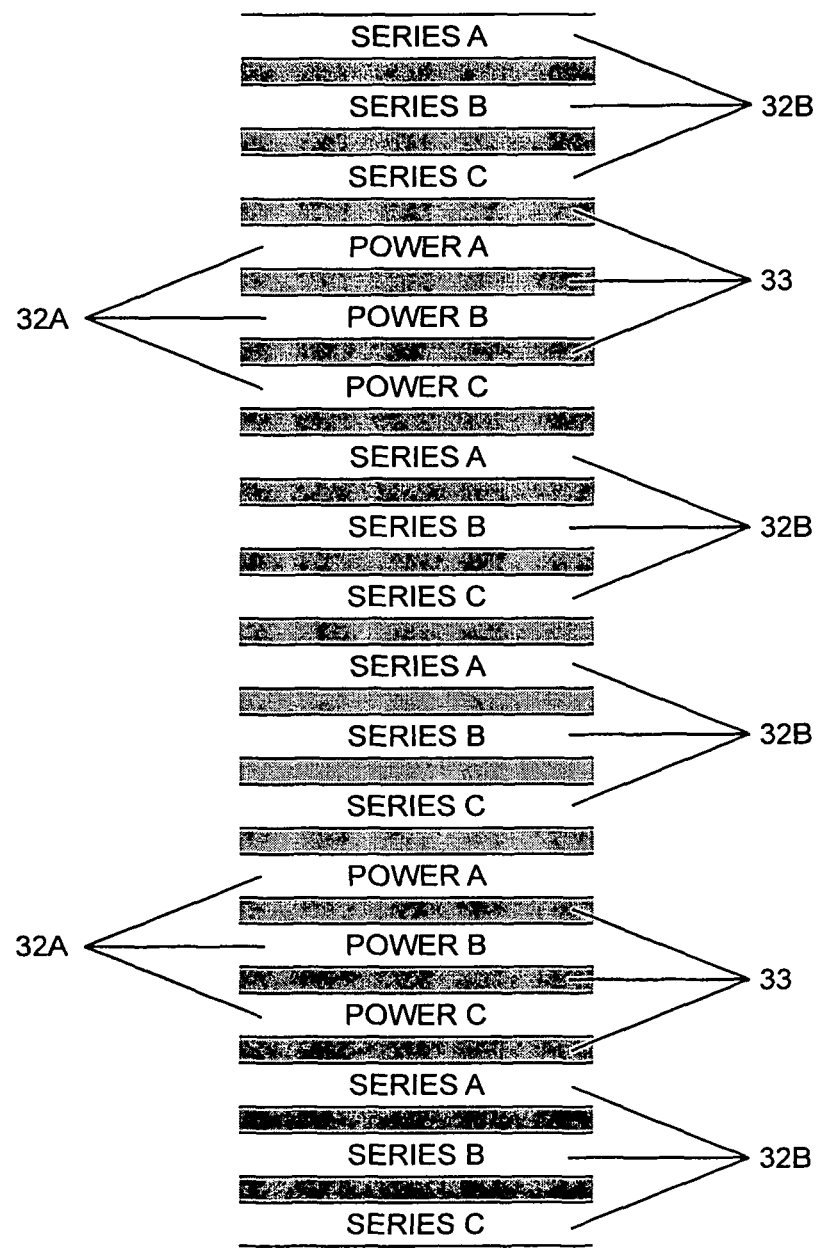
FIG. 10 is a diagram showing one arrangement of the stacking of power layers and series layers for phases A, B and C.
Figure 11:
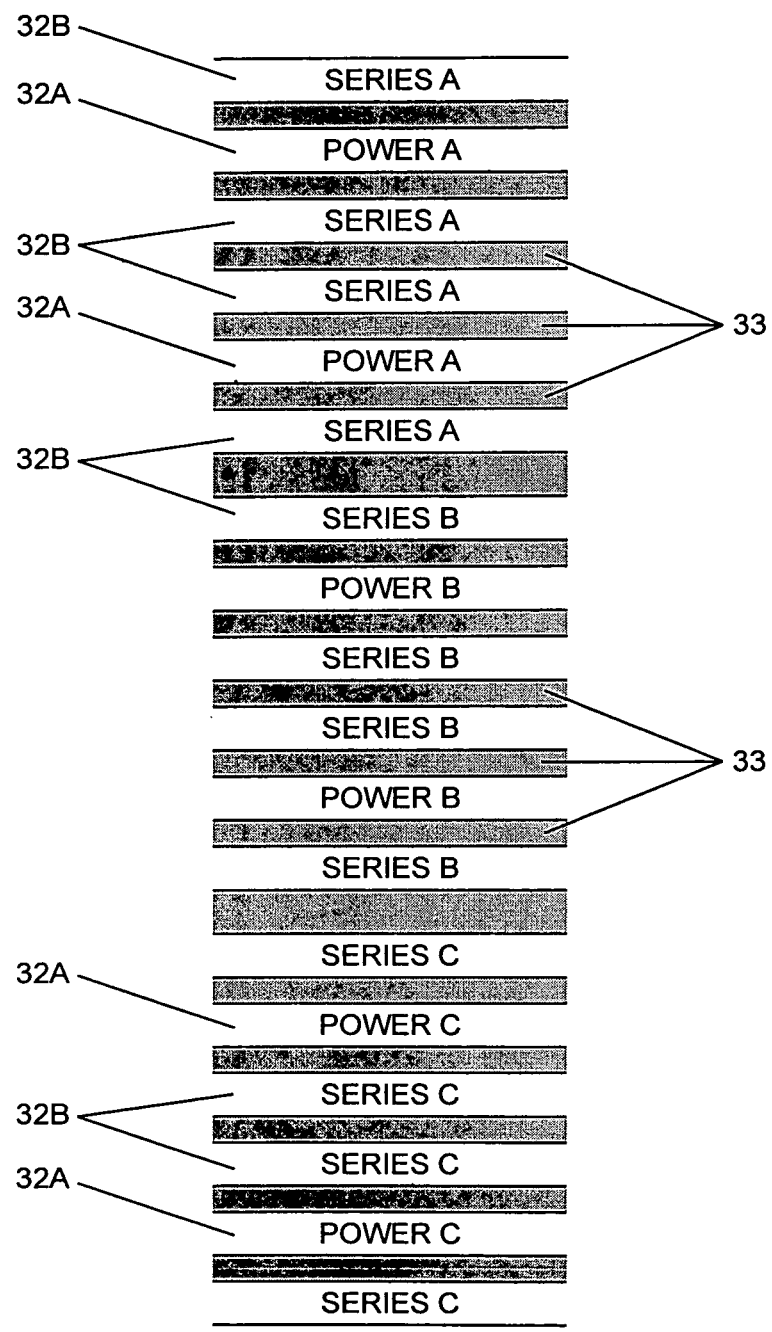
FIG. 11 is a diagram showing another arrangement of the staking of power layers and series layers for phases A, B and C.

As a non-limiting example, a stator segment with eighteen layers might have two power layers for phase A, four series layers for phase A, two power layers for phase B, four series layers for phase B, two power layers for phase C, and four series layers for phase C. FIG. 10 shows one possible stacking arrangement of the layers that provides an even distribution of the electrical current. FIG. 11 shows another possible stacking arrangement of the layers that provides an even distribution of the electrical current and added isolation of the phases for medium and high voltages.

Figure 12:
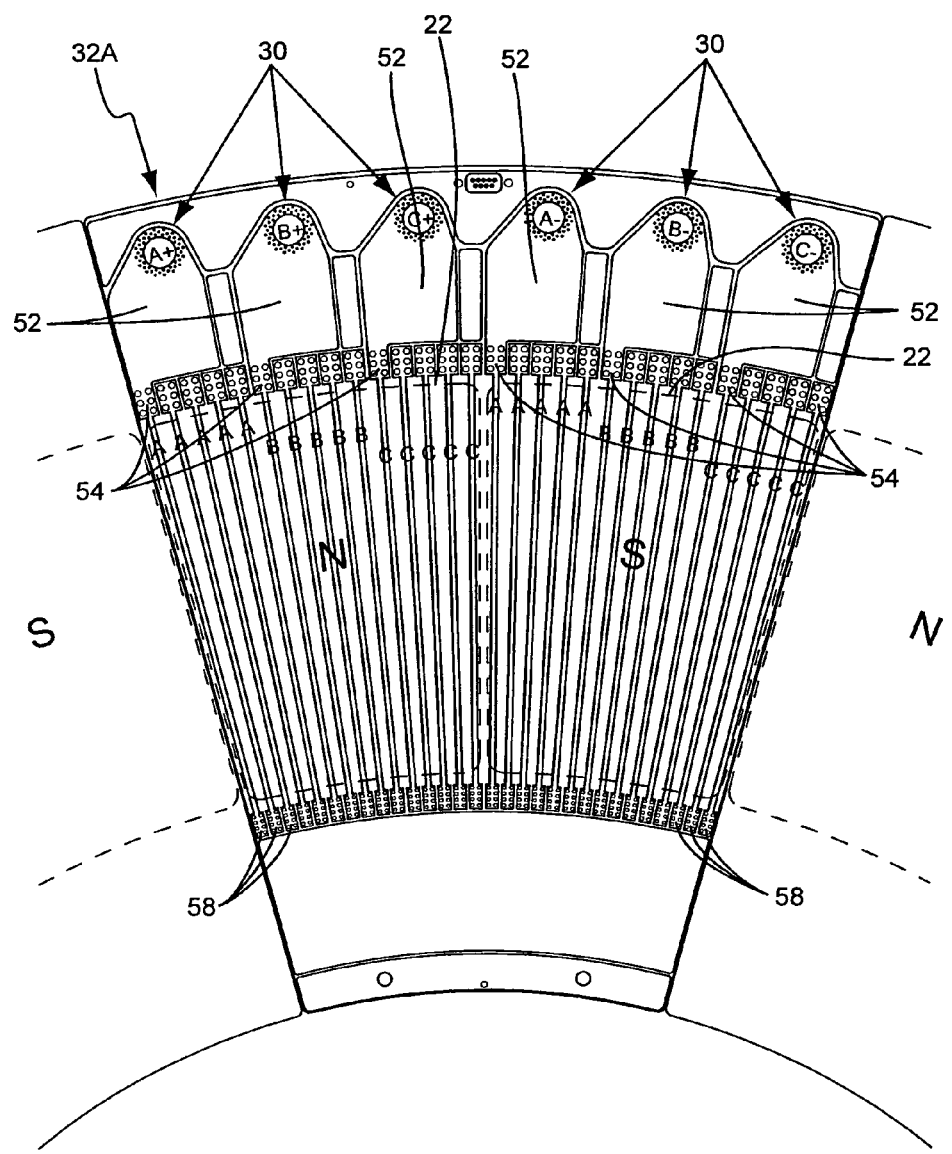
FIG. 12 is a detail view of one segment of a power layer of a stator board according to a second embodiment of the present invention.

FIG. 12 shows another embodiment of the stator segment 32. In this embodiment, a pattern etched into a conductive layer of a stator power segment 32A' includes the terminal conductors 52 for phases A, B, and C. In this embodiment, the power layers for phases A, B, and C as described above would be identical. The main benefit of this embodiment is that there are more terminal conductors 52 in parallel for each phase. However, the inner end turns that were present on the power layers of 32A shown in FIGS. 4, 6, and 8 are absent in this embodiment. With this stator power segment 32A', it is necessary to use the three stator series segments 32B for the phases A, B and C as shown in FIGS. 5, 7 and 9.

Figure 13:
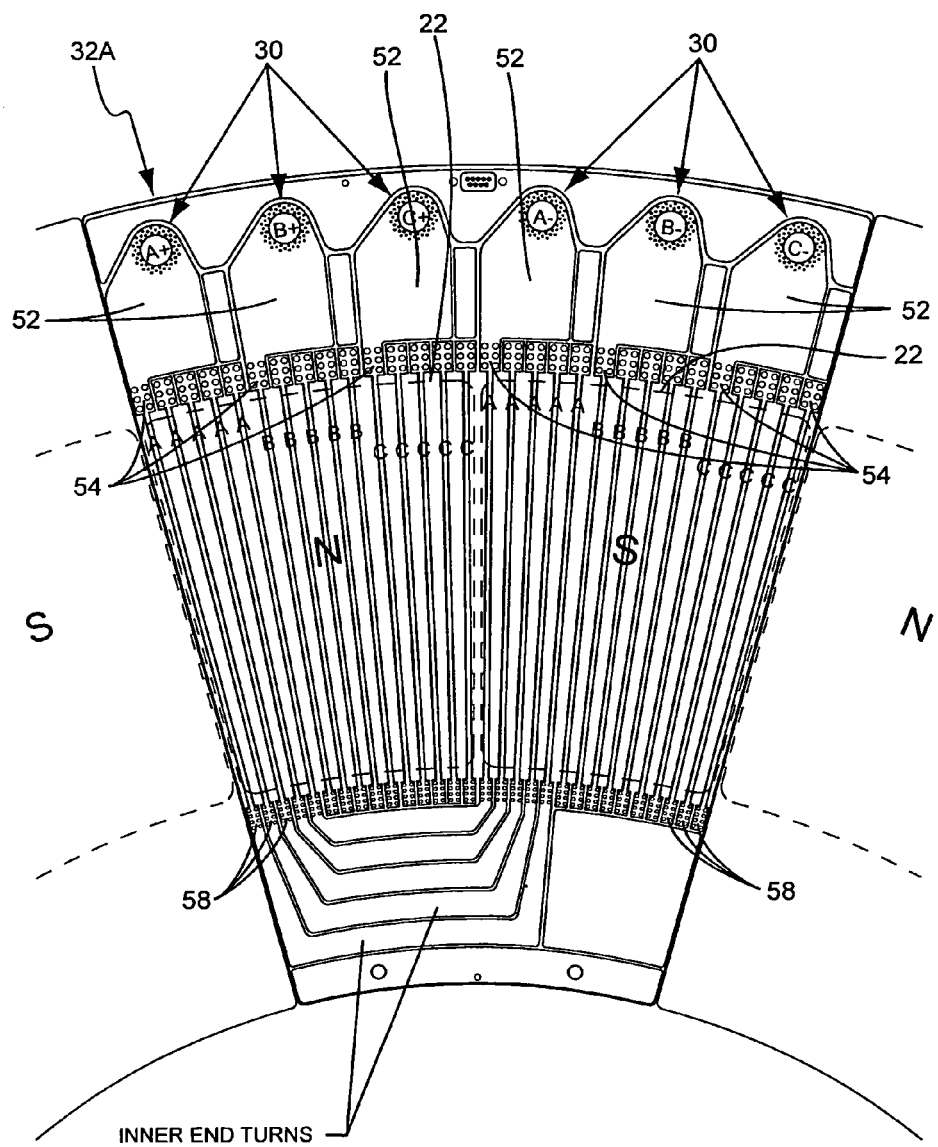
FIG. 13 is a detail view of one segment of a power layer of a stator board according to a third embodiment of the present invention.

FIG. 13 illustrates another embodiment of the stator segment where the inner end turns are present on a stator power segment 32A" that contains terminal conductors 52 for phases A, B, and C. This pattern would then be a power layer for phase A and the power layers in this embodiment therefore are not identical. The power layer for phase B would contain the inner end turns for phase B and the power layer for phase C would contain the inner end turns for phase C. With this stator segment 32A" it is again necessary to use the three stator series segments 32B for the phases A, B and C as shown in FIGS. 5, 7 and 9.

Figure 14:
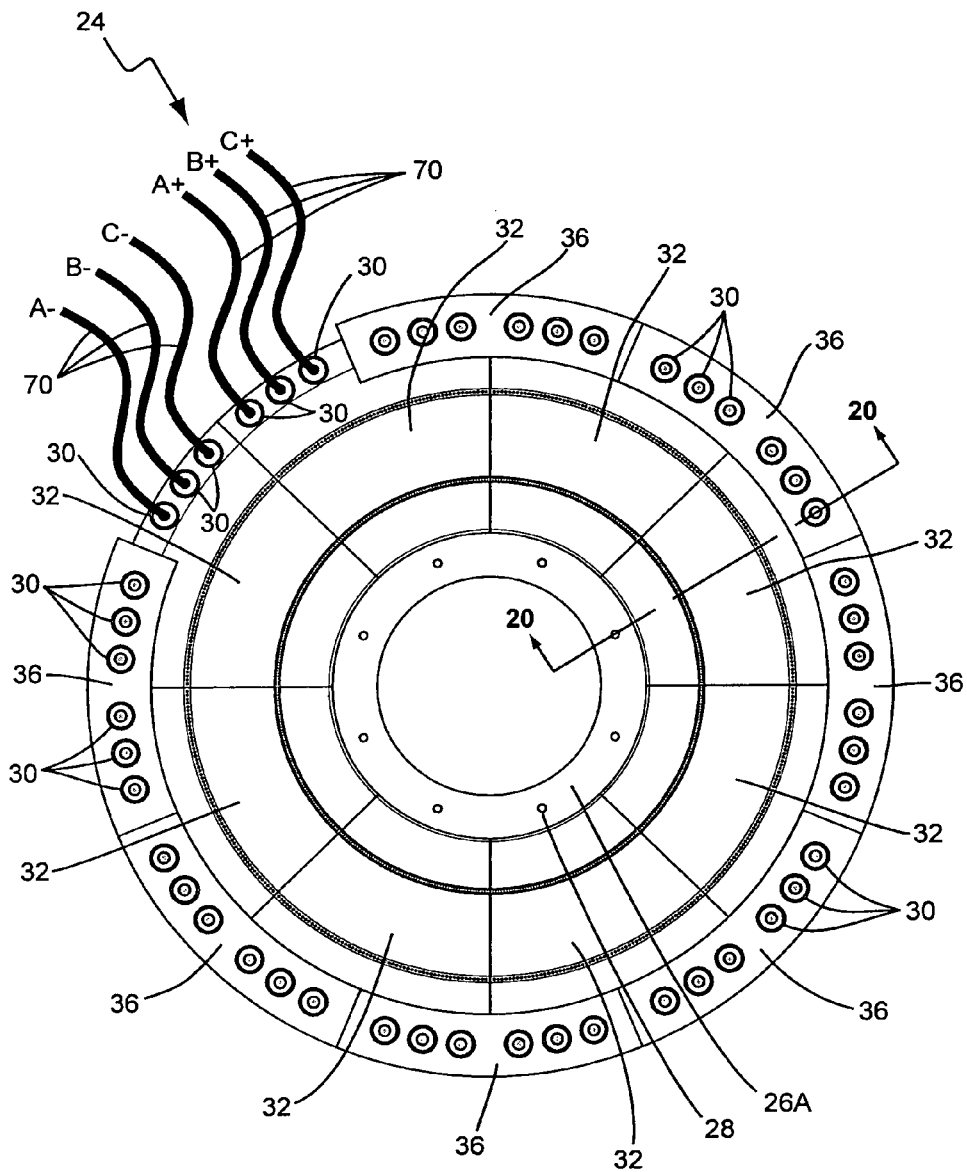
FIG. 14 is a plan view of a stator board showing the arrangement of stator segments and daughter printed circuit boards according to the first embodiment of the present invention.

FIG. 14 illustrates the arrangement of stator segments 32 and daughter printed circuit boards 36 in one embodiment of a stator assembly. The stator assembly has phase conductor wires 70 for phases A, B, and C; an inner clamp ring 26A; bolts 28; and a plurality of daughter printed circuit boards 36 attached to an array of stator segments 32. The stator assembly 24 includes six terminal lugs 30 which are connected to the six phase conductor wires 70 as shown. The phase conductor wires 70 may be arranged as shown or may be configured for a wye or delta connection with the stator assembly 24 as is well known in the art.

Figure 20:
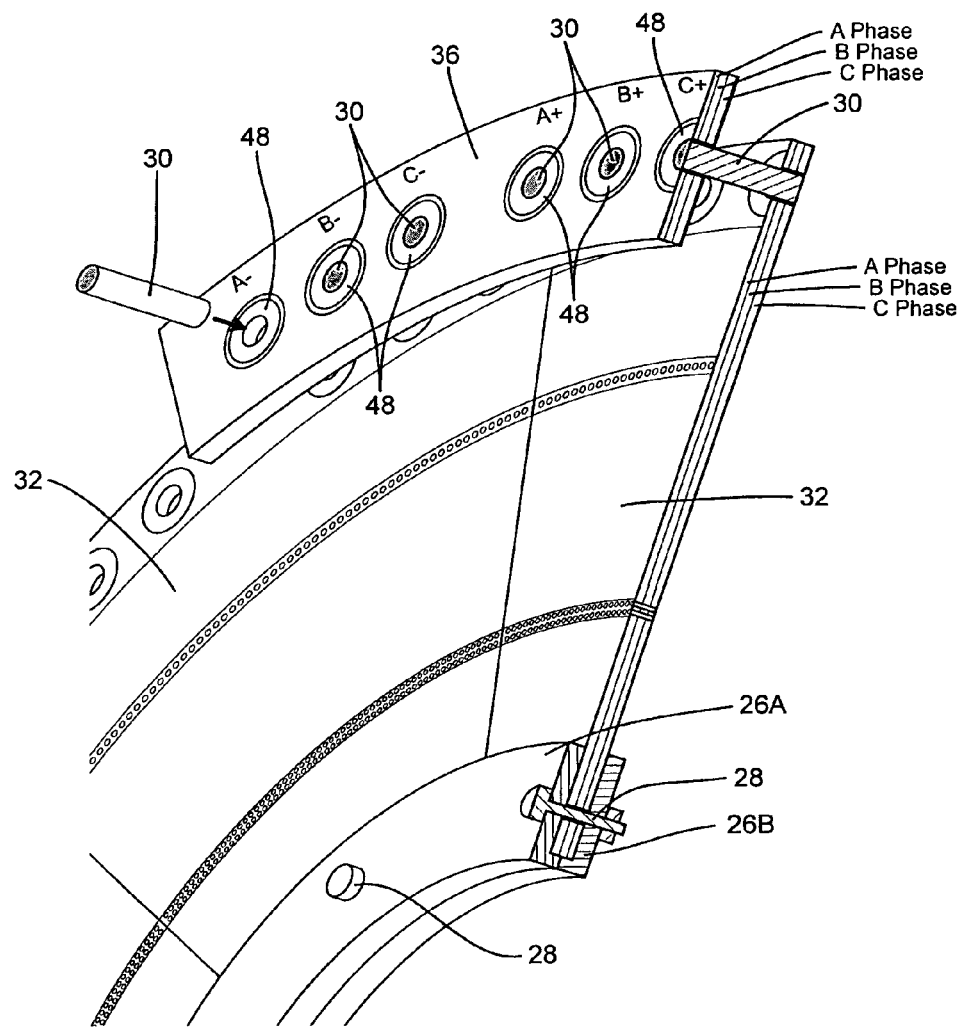
FIG. 20 is a perspective sectional view taken along the line 20-20 in FIG. 14.

The daughter printed circuit boards 36 are used to electrically connect adjacent stator segments 32 together. As shown in FIG. 20, the daughter boards 36 are arranged so that three terminal lugs 30 (A−, B− and C−) of a daughter printed circuit board 36 are positioned over the corresponding terminal lugs 30 of one stator segment 32 and three terminal lugs 30 (A+, B+ and C+) of the same daughter printed circuit board 36 are positioned over the corresponding terminal lugs 30 of the adjacent stator segment 32.

Figure 15:
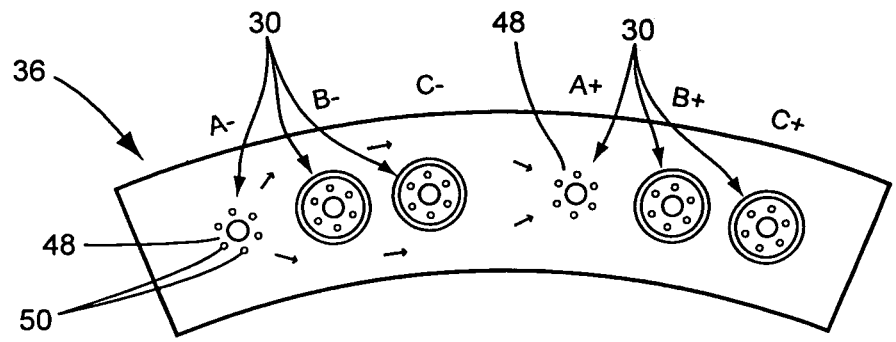
FIG. 15 shows a daughter printed circuit board for the A phase.
Figure 16:
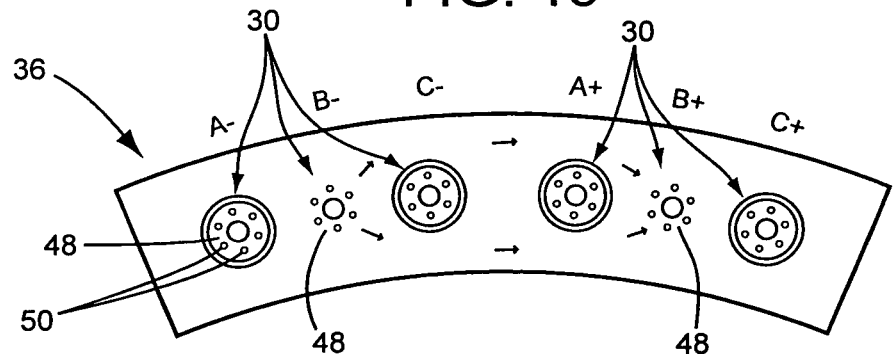
FIG. 16 shows a daughter printed circuit board for the B phase.
Figure 17:
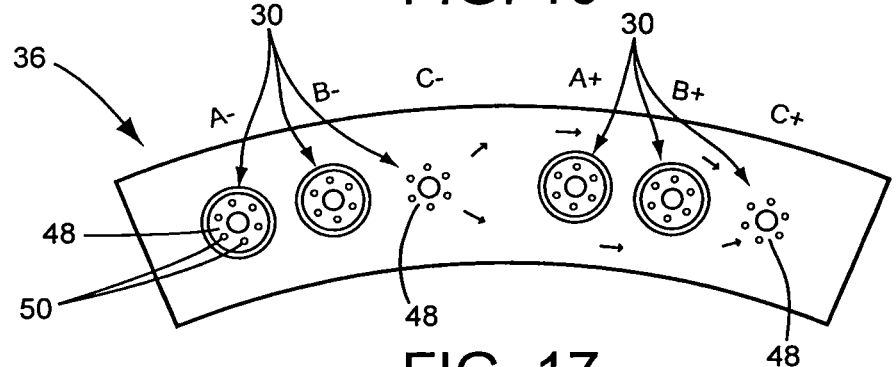
FIG. 17 shows a daughter printed circuit board for the C phase.
Figure 18:
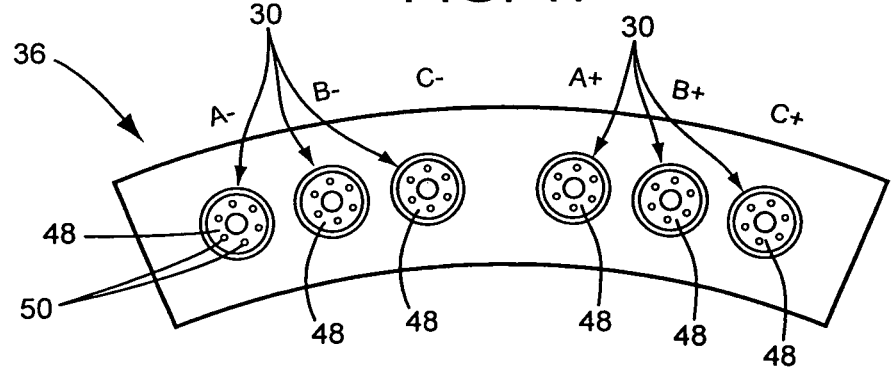
FIG. 18 shows a daughter printed circuit board for the A, B, and C phases electrically isolated.

FIGS. 15 through 17 show the electrical current path on each of the layers of conductive material in the daughter printed circuit boards 36. FIG. 15 shows a pattern etched into a daughter printed circuit board 36 with terminal vias 50 for A− and A+ having an electrical current path between them. The terminal vias 50 for B−, C−, B+, and C+ are isolated from the terminal vias 50 for A− and A+. The terminal lugs 30 have terminal pads 48 with vias 50 that electrically connect the terminal pads 48 to the corresponding terminal pads 48 on all of the other layers of conductive material of the daughter printed circuit boards 36. In FIG. 15, the electrical current for phase A flows from the A− terminal pad 48 through the daughter printed circuit board 36 to the A+ terminal pad 48. In FIG. 16, the electrical current for phase B flows from the B− terminal pad 48 through the daughter printed circuit board 36 to a B+ terminal pad 48. In FIG. 17, the electrical current for phase C flows from C− terminal pad 48 through the daughter printed circuit board 36 to a C+ terminal pad 48. FIG. 18 shows daughter printed circuit board 36 which has all of the terminal pads 48 for the A−, B−, C−, A+, B+, and C+ isolated from one another. In a preferred embodiment, the daughter printed circuit boards 36 shown in FIGS. 15-17 are stacked one upon the other with a dielectric substrate layer in between them. The daughter printed circuit board 36 shown in FIG. 18 is preferably placed on the first and the last layer of the daughter printed circuit board stack in order to electrically isolate the phases on the exterior surfaces the daughter printed circuit boards 36.

Figure 19:
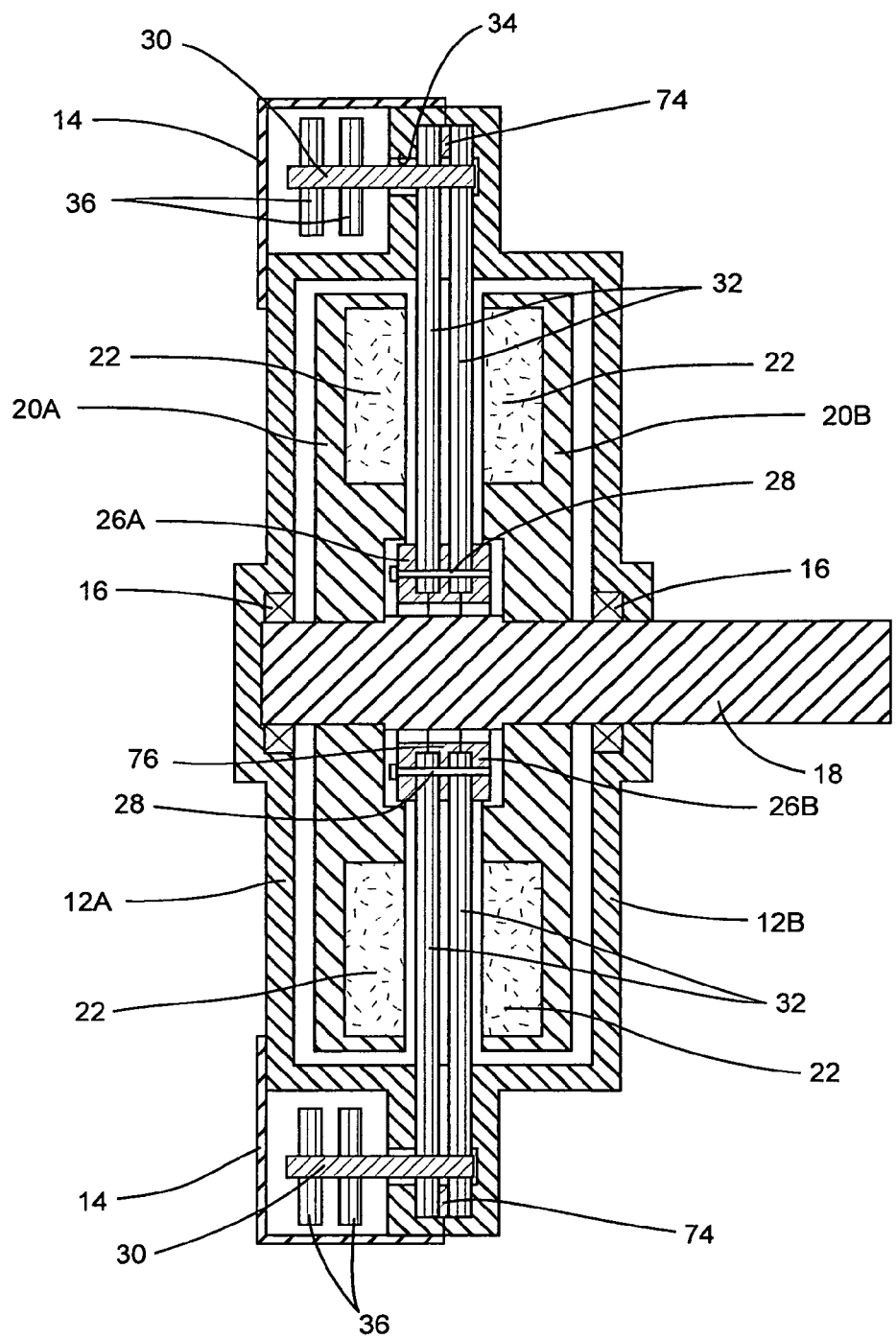
FIG. 19 is a cross sectional view taken along the line 2-2 in FIG. 1 showing a fourth embodiment of the present invention.

FIG. 19 shows another embodiment of the invention which has a stator assembly 24 with two arrays of stator segments 32. The stator segments are electrically connected in parallel by the terminal lugs 30. An outer spacer 74 and an inner spacer 76 keep the stator segments apart to allow for electrical isolation and thermal dissipation. Also shown in FIG. 19 is an arrangement of two stacks of daughter printed circuit boards 36 mounted in parallel across each set of terminal lugs 30. As should be understood by this example, there can by more than two arrays of stator segments 32 within the stator assembly 24. Also it should be understood that there may by more than two stacks of daughter printed circuit boards 36 mounted in parallel across each set of terminal lugs 30. The benefit of having arrays of stator segments 32 and stacks of daughter printed circuit boards 36 mounted in parallel is to reduce the electrical resistance of the circuit.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

We claim:

1. An axial field rotary energy device having positive and negative polarity, multi-phase electric current terminals comprising:
    a rotor having a plurality of permanent magnet poles; and
    a segmented stator assembly having a plurality of stator segments arranged in an annular array with each stator segment having:
        a plurality of printed circuit board power conductor layers having at least one power conductor layer for each phase of the electric current, each of said power conductor layers having a pattern of a plurality of radial conductors running between an inner via and an outer via, said inner vias being located at an inner diameter of said power conductor layer and said outer vias being located at an outer diameter of said power conductor layers;
        each power conductor layer further having a pair of positive and negative terminal vias of one phase of the electric current and located adjacent an outer edge of each power conductor layer and further having a pair of terminal conductors for electrically connecting the positive and negative terminal vias to selected outer vias;
        a plurality of printed circuit board series layers, at least one of which is associated with each power conductor layer, and each one including a pattern of a plurality of radial conductors running between an inner via and an outer via, said inner vias being located at an inner diameter of said series conductor layer and said outer vias being located at an outer diameter of said connecting series conductor layer;
        each series conductor layer further having a plurality of outer conductors for electrically connecting selected outer vias together and a plurality of inner conductors for electrically connecting selected inner vias together;
        the inner and outer vias of the power conductor layer and the series conductor layer arranged for electrically connecting selected ones of the radial conductors of the series conductor layer to selected ones of the radial conductors of the power conductor layer;
    a daughter printed circuit board for electrically connecting two adjacent segments together;
    each daughter printed circuit board having a first portion electrically connected to a negative terminal via located in one segment and a second portion electrically connected to the positive terminal via located in an adjacent segment together with a current conductor electrically connected between the said negative terminal via and the said positive terminal via; and
    the segmented stator assembly further including a pair of phase conductors for electrically connecting the positive and negative current terminal of one phase of the electric current to selected ones of the positive and negative terminal vias of the segmented stator assembly.

2. The axial field rotary device according to claim 1 wherein each power conductor layer includes a plurality of inner conductors for electrically connecting selected inner vias together.

3. The axial field rotary energy device according to claim 1 wherein each printed circuit board power layer has a planer configuration and each circuit board series conductor layer has a planer configuration and each stator segment is formed by stacking the power conductor layers and the connecting conductor layers one upon the other with a substrate layer in between each layer.

4. The axial field rotary energy device according to claim 1 wherein the stator assembly has a central bore there through in a direction perpendicular to the planer configuration of the layers and further including a rotatable driveshaft extending through the central bore and further including a first rotor fixedly secured to the driveshaft on one side of the stator and a second rotor fixedly secured to the driveshaft on the opposite side of the stator assembly.

5. The axial field rotary energy device according to claim 4 wherein the permanent magnet poles of the first rotor are positioned with respect to the permanent magnet poles of the second rotor so that flux lines pass through the stator assembly in a direction perpendicular to the planer configuration of the power conductor layers.

6. The axial field rotary energy device according to claim 1 wherein each power conductor layer and each series conductor layer is divided into sectors with each sector associated with a positive or negative polarity of each phase of the electric current and with radial conductors running through each sector.

7. The axial field rotary energy device according to claim 1 configured for at least a 3-phase electric current.

* * * * *